United States Patent
Ritschel et al.

(10) Patent No.: US 11,366,905 B2
(45) Date of Patent: Jun. 21, 2022

(54) SECURITY DEVICE AND METHOD FOR OPERATING A SYSTEM

(71) Applicant: SEW-EURODRIVE GMBH & CO. KG, Bruchsal (DE)

(72) Inventors: Andreas Ritschel, Dettenheim (DE); Benjamin Norenburg, Karlsdorf-Neuthard (DE); Christian Senft, Karlsruhe-Grünwettersbach (DE); Sebastian Richter, Heidelberg (DE); Inga Meckelnburg, Limburgerhof (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 817 days.

(21) Appl. No.: 16/315,354

(22) PCT Filed: May 15, 2017

(86) PCT No.: PCT/EP2017/025129
§ 371 (c)(1),
(2) Date: Jan. 4, 2019

(87) PCT Pub. No.: WO2018/007015
PCT Pub. Date: Jan. 11, 2018

(65) Prior Publication Data
US 2019/0311124 A1 Oct. 10, 2019

(30) Foreign Application Priority Data
Jul. 4, 2016 (DE) ................... 10 2016 008 010.8

(51) Int. Cl.
*G06F 21/57* (2013.01)
*H04N 21/426* (2011.01)
(Continued)

(52) U.S. Cl.
CPC .......... *G06F 21/572* (2013.01); *F16H 57/01* (2013.01); *G07C 9/00309* (2013.01);
(Continued)

(58) Field of Classification Search
CPC ........ G06F 21/572; G06F 21/86; G06F 21/79; G06F 21/34; F16H 57/01; G07C 9/00309;
(Continued)

(56) References Cited

U.S. PATENT DOCUMENTS 6,026,293 A * 2/2000 Osborn ................ H04L 63/123
455/411
6,353,776 B1 * 3/2002 Rohrl ................ G07C 9/00309
340/426.16
(Continued)

FOREIGN PATENT DOCUMENTS

CA 2630485 C * 7/2012 .......... H04L 9/3236
CN 1805870 A 7/2006
(Continued)

OTHER PUBLICATIONS

L. Baolin, W. Tongmin, F. Shuai and F. Jiangpeng, "Study and design of gateway engine immobilizer based on CAN-bus," 2011 International Conference on Consumer Electronics, Communications and Networks (CECNet), 2011, pp. 751-755, doi: 10.1109/CECNET.2011.5768931. (Year: 2011).*
(Continued)

*Primary Examiner* — Michael Simitoski
(74) *Attorney, Agent, or Firm* — Carter, DeLuca & Farrell LLP

(57) ABSTRACT

A security device includes at least one non-volatile memory element and a key memory having at least one non-volatile memory element including at least one data field. The security device provides a physical interface for the data exchange with a key memory, the range of the physical
(Continued)

interface being spatially restricted, and the key memory being location-bound. The security device includes at least one calculation unit, which dynamically ascertains in particular the check-sum information from the parameter data record.

13 Claims, 4 Drawing Sheets

(51) Int. Cl.
    *G08B 23/00*     (2006.01)
    *G05B 19/05*     (2006.01)
    *F16H 57/01*     (2012.01)
    *G07C 9/00*     (2020.01)
    *G05B 19/042*     (2006.01)

(52) U.S. Cl.
    CPC ....... *G08B 23/00* (2013.01); *H04N 21/42684* (2013.01); *G05B 19/0425* (2013.01); *G05B 19/058* (2013.01)

(58) Field of Classification Search
    CPC .............. G08B 23/00; H04N 21/42684; G05B 19/0425; G05B 19/058; H04L 2209/84; H04L 67/12; H04L 9/0816; H04L 9/0869; B60R 25/20; H04W 12/06; H02J 7/00045
    See application file for complete search history.

(56) References Cited

U.S. PATENT DOCUMENTS

| | | | | |
|---|---|---|---|---|
| 6,463,537 | B1* | 10/2002 | Tello | G06F 21/34 380/277 |
| 7,587,600 | B2* | 9/2009 | Bodensjo | H04L 9/3247 713/176 |
| 7,626,487 | B2 | 12/2009 | Ogiso | |
| 8,275,130 | B2 | 9/2012 | Kawamura et al. | |
| 9,143,320 | B2* | 9/2015 | Kawamura | H04L 9/0869 |
| 9,270,649 | B1* | 2/2016 | Ng | H04L 63/123 |
| 10,146,706 | B2* | 12/2018 | Bolotin | G06F 3/0673 |
| 2007/0300207 | A1* | 12/2007 | Booth | G06F 21/575 717/126 |
| 2008/0027602 | A1* | 1/2008 | Yeap | B60R 25/04 701/31.4 |
| 2008/0256363 | A1* | 10/2008 | Balacheff | G06F 21/572 713/187 |
| 2009/0263236 | A1* | 10/2009 | Goll | F16K 31/047 415/148 |
| 2011/0087872 | A1* | 4/2011 | Shah | G06F 21/572 713/2 |
| 2011/0138164 | A1* | 6/2011 | Cha | H04N 21/4432 713/2 |
| 2013/0043740 | A1* | 2/2013 | Xu | H01F 7/14 310/12.04 |
| 2013/0066525 | A1* | 3/2013 | Tomik | B60R 25/04 701/45 |
| 2013/0111582 | A1* | 5/2013 | Forest | G06F 21/44 726/19 |
| 2013/0268746 | A1* | 10/2013 | Hsu | G06F 9/4401 713/2 |
| 2014/0122897 | A1* | 5/2014 | Dodeja | H04L 9/3239 713/189 |
| 2014/0156886 | A1* | 6/2014 | Yu | H04L 41/0846 710/104 |
| 2014/0310509 | A1* | 10/2014 | Potlapally | G06F 21/57 713/2 |
| 2015/0084753 | A1* | 3/2015 | Biondo | B60R 25/246 340/426.11 |
| 2015/0120151 | A1* | 4/2015 | Akay | B60R 25/24 701/49 |
| 2015/0362997 | A1* | 12/2015 | Hatton | G06F 3/017 701/2 |
| 2016/0180095 | A1* | 6/2016 | Sarangdhar | G06F 21/575 713/2 |
| 2016/0266894 | A1* | 9/2016 | Panicker | H04L 67/34 |
| 2017/0097830 | A1* | 4/2017 | Ehrenberg | G06F 9/4406 |
| 2017/0134382 | A1* | 5/2017 | Darnell | H04W 12/041 |
| 2017/0267213 | A1* | 9/2017 | Berezin | B60K 37/06 |
| 2017/0322845 | A1* | 11/2017 | Nomura | G06F 11/1076 |
| 2017/0352210 | A1* | 12/2017 | Maiwand | G07C 9/00857 |
| 2017/0352214 | A1* | 12/2017 | Maiwand | G07C 9/00857 |
| 2017/0372074 | A1* | 12/2017 | Gunti | G06F 9/44 |

FOREIGN PATENT DOCUMENTS

| | | | | |
|---|---|---|---|---|
| CN | 101827076 | A | 9/2010 | |
| CN | 101496251 | B * | 1/2013 | ............. B60L 58/12 |
| CN | 103390301 | A | 11/2013 | |
| DE | 102008005252 | A1 | 7/2009 | |
| DE | 102011016889 | A1 * | 10/2012 | ............. B60R 25/04 |
| DE | 102015207004 | A1 | 3/2016 | |
| JP | 2000204807 | A | 7/2000 | |
| JP | 2005060949 | A | 3/2005 | |

OTHER PUBLICATIONS

B. Davis and R. DeLong, "Combined remote key control and immobilization system for vehicle security," Power Electronics in Transportation, 1996, pp. 125-132, doi: 10.1109/PET.1996.565920. (Year: 1996).*

Verdult, Roel, Flavio D. Garcia, and Baris Ege. "Dismantling megamos crypto: Wirelessly lockpicking a vehicle immobilizer." Supplement to the Proceedings of 22nd {USENIX} Security Symposium (Supplement to {USENIX} Security 15). 2015. (Year: 2015).*

International Preliminary Report on Patentability issued in International Patent Application No. PCT/EP2017/025129, dated Jan. 8, 2019 (7 pages total).

International Search Report dated Aug. 2, 2017, in International Application No. PCT/EP2017/025129 (English-language translation).

Anonymous, "Smart key—Wikipedia, the free encyclopedia," Oct. 20, 2012, Retrieved from the Internet: URL: http://en.wikipedia.org/w/index.php?title=Smart_key&direction=next&oldid=516750902, retrieved on Mar. 17, 2014.

* cited by examiner

SECURITY DEVICE AND METHOD FOR OPERATING A SYSTEM

FIELD OF THE INVENTION

The present invention relates to a security device and to a method for operating a system.

BACKGROUND INFORMATION

In certain conventional systems, the properties of a security device can be modified via a parameterization device.

In addition, in certain conventional systems, a parameterization device can be used to transmit a parameter data record as well as an item of check-sum information of this parameter data record to a security device, typically in order to discover errors during the exchange of data.

Furthermore, in certain conventional systems, after an exchange of an already parameterized security device, the exchanged security device must be re-parameterized.

German Published Patent Application No. 10 2008 045 476 describes that individual components of a system exchange information with one another.

German Published Patent Application No. 103 50 715 describes a method for storing parameter values in an internal and/or an external data memory.

German Published Patent Application No. 199 61 920 describes a method for the remote parameterization and/or the remote operation of a drive system.

SUMMARY

Example embodiments of the present invention provide for minimizing the idle time of a production system, and thus the economic costs, in that a simple and time-optimized device exchange of a security device.

According to an example embodiment of the present invention, a security device, in particular as part of an electronic power drive system having adjustable rotational speed and a configuration that is suitable for use in security-directed applications, includes: at least one non-volatile memory element, which especially includes a parameter data record for operating said security device; and a key memory. The key memory includes at least one non-volatile memory element, having at least one data field, which especially includes an item of check-sum information of a security device. The security device provides a physical interface for the data exchange with a key memory, and the range of the physical interface is spatially restricted, and in particular relating only to the immediate vicinity around the security device. The key memory is location-bound, in particular spatially allocatable in a permanent manner to a specific point within a system as a whole, and the security device includes having at least one calculation unit, which in particular dynamically ascertains the check-sum information from the parameter data record. The security device includes at least one comparator unit, which especially compares the check-sum information included in the key memory to the dynamically calculated check-sum information of the security device in order to provide the result to the security device as enabling information. The operating state of the security device depends on this enabling information from the comparator unit. Enabling information that signals the equality of the check-sum information enables the security device to change from a secure operating state to the normal operating state, in particular to a state featuring an electric motor under torque, and enabling information that signals the inequality of the check-sum information enables the security device to change to a secure operating state, in particular to a state featuring a torque-free electric motor.

This offers the advantage that the system is able to leave the secure operating state only if the check-sum information stored in the external key memory is identical to the check-sum information of the parameter data record of the security device.

In example embodiments of the present invention, the problem of a renewed parameterization during the exchange of a typically defective security device is addressed in that during the initial start-up and/or during each further modification of the adjustment parameters of this security device, the adjustment parameters are additionally backed up via a parameterization device in a memory module, in particular as part of a system component that is not secure, typically a converter and/or a higher-level control and/or a PC connected to the control.

From this memory medium, the adjustment parameters for an exchanged device are able to be recovered, the exchanged security device being operable only when using a parameter data record specially provided for this security device, which is identifiable via the check-sum information of an external and location-bound key memory, which particularly is permanently allocatable to a specific point in the system.

The security device may be directly connectable to a converter (8), in particular using plugs, and a memory module is directly connected to, in particular integrated into, the converter. This is considered advantageous insofar as it allows for an uncomplicated production.

The security device may be directly connectable to a converter, especially with the aid of plugs, the converter being connected via a field-bus system to a higher-level control, in particular a memory-programmable control, this higher-level control having a memory module. This is considered advantageous insofar as it allows for a simple production.

The security device may be connectable to a higher-level control, in particular a memory-programmable control, via a field-bus system, this higher-level control including a memory module. This has the advantage that data are easily able to be stored.

A device, in particular a parameterization device, may be directly connectable to the higher-level control, in particular a memory-programmable control. This offers the advantage that a data input is able to be carried out with the aid of the parameterization device.

A device, in particular a parameterization device, may be connectable to the converter via a field-bus system. This is considered advantageous insofar as a simple connection is able to be established.

A device, in particular a parameterization device, may be directly connectable to the converter. This offers the advantage of allowing for an uncomplicated production.

The parameter data record of the security device may be modifiable via a device, in particular a parameterization device. This is considered advantageous insofar as a simple data input is possible.

The calculated check-sum information of the parameter data record of the security device may be additionally also storable via the security device in a key memory, which is directly connected to this particular security device. This offers the advantage that increased security is able to be achieved, in particular in an uncomplicated manner.

The parameter data record of the security device may be stored as a shadow copy via a device, in particular via a parameterization device, in a memory medium outside the security device. This has the advantage of increasing the security and allowing for a simple exchange.

The key memory may be able to be connected to the security device, in particular with the aid of plugs, via a device for accommodating the key memory through the housing of the security device. This is considered advantageous insofar as the key memory is physically linked to the security device and is identifiable together with it as a unit, i.e. the key memory and the security device are biuniquely connected.

The security device may be able to read out the key memory via an electrically conductive connection, in particular via an electrically conductive connection made up of only two lines, typically arranged as a one-wire bus. This has the advantage that a compact and cost-effective realization of the key memory is possible using only a few components.

The key memory may be able to be read out by the security device via an electromagnetic connection, in particular using RFID technology. This has the advantage that cost-intensive plug connectors may be dispensed with.

The key memory may be permanently connectable to the location in which the security device (1) is also installed in the system as a whole, the connection being implemented via a device, in particular via a connection chain. This offers the advantage that the location-bound reference of the key memory within the overall system is thereby emphasized and protection against the loss of the key memory itself is obtainable in addition.

The security device may include a device by which the key memory is able to be permanently connected to the security device, in particular a device having a mechanism for securing and releasing the plug-in connection. This offers the advantage of actively preventing a detachment of the key memory from the security device as the result of strong vibrations, which would mean that a communications link between the parameterization device and this security device would therefore no longer be possible.

According to an example embodiment of the present invention, in a method for operating a system, which includes at least one security device, having a key memory, a converter and/or a higher-level control including a memory module and a parameterization device, the parameter data record of a security device being able to be provided via the parameterization device, the check-sum information of this parameter data record is able to be generated via the calculation unit and transmitted to the key memory connected to this security device, the parameter data record is additionally transmittable via the parameterization device to the available memory modules and to further security devices via a data backup, during each restart, the security device compares the check-sum information available in the key memory with the check-sum information of the parameter data record of the security device, an equality of the two items of check-sum information allowing for the operative state, in particular a state featuring an electric motor under torque, and an inequality of the two items of check-sum information setting the security device into a secure operating state, in particular a state featuring a torque-free electric motor, and signaling an error via a device.

This has the advantage that a validated data record is able to be transmitted to a plurality of devices via the parameterization device, without any new certification outlay, which also means that only a single data record has to be stored in the memory medium.

According to an example embodiment of the present invention, in a method for operating a system that includes at least one security device, having a key memory, a converter, and/or a higher-level control including a memory module and a parameterization device, the security device is exchangeable, in particular following a defect, the location-bound key memory of the old, in particular defective, security device is connected to the new security device, the converter and/or the higher-level control detect the exchange of the security device and transmit the shadow copy of the parameter data record available in the memory module to this security device, in particular automatically, during each restart, the security device compares the check-sum information available in the key memory to the check-sum information of the parameter data record of the security device, an equality of the two items of check-sum information allowing the operative state, in particular a state featuring an electric motor under torque, and an inequality of the two items of check-sum information setting the security device into a secure operating state, in particular a state featuring a torque-free electric motor, and signaling an error via a device. This has the advantage of ensuring that the security device may be restarted only when using the correct parameter data record. Even a system that is not secure is therefore able to provide the parameter data record for a secure system for the recovery during a device exchange or a similar event.

According to an example embodiment of the present invention, in a method for operating a system that includes at least one security device, having a key memory, a converter, and/or a higher-level control having a memory module and a parameterization device, the security device is exchangeable, in particular following a defect, the location-bound key memory of the old, in particular defective, security device is connected to the new security device, a parameter data record, available from a previously implemented data backup, is able to be transmitted to this security device via the parameterization device, and during each restart, the security device compares the check-sum information available in the key memory with the check-sum information of the parameter-data record of the security device, an equality of the two items of check-sum information enabling the operative state, in particular a state featuring an electric motor under torque, and an inequality of the two items of check-sum information setting the security device into a secure operating state, in particular a state featuring a torque-free electric motor, and signaling an error via a device.

This offers the advantage of ensuring that the security device is able to be restarted only when using a correct parameter data record. Even a system that is not secure is therefore able to provide the parameter data record for a secure system for recovery during a device exchange or a similar event.

Further features and aspects of example embodiments of the present invention are described in greater detail below with reference to the appended Figures.

DETAILED DESCRIPTION

Figure 1:
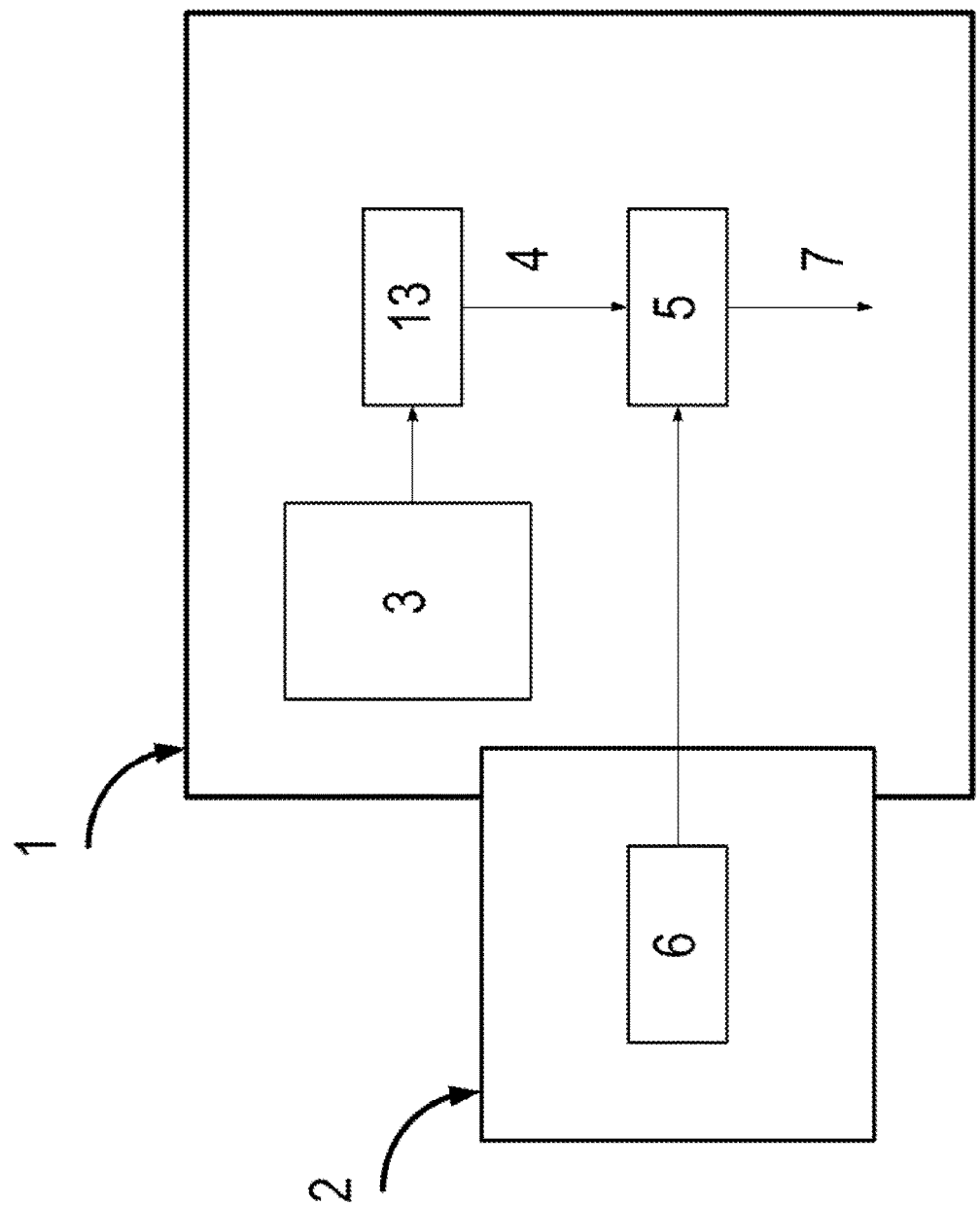
FIG. 1 schematically illustrates a security device according to an example embodiment of the present invention.

In FIG. 1, a security device (1) according to an example embodiment of the present invention is schematically illustrated, the security device (1) being electrically connected to the key memory (2), especially using plugs, and the key memory (2) includes a memory element (6) for check-sum information, and the memory element (6) is able to be read out by the security device (1).

In addition, the security device includes a memory element (3) for parameter data records; a calculation unit (13) for dynamically ascertaining the check-sum information (4) of these parameter data records; and a comparator unit (5), which evaluates the dynamically ascertained check-sum information (4) of the parameter data record and the check-sum information (6) of the key memory (2) and makes the result available as enabling information to the security device (1).

Figure 2:
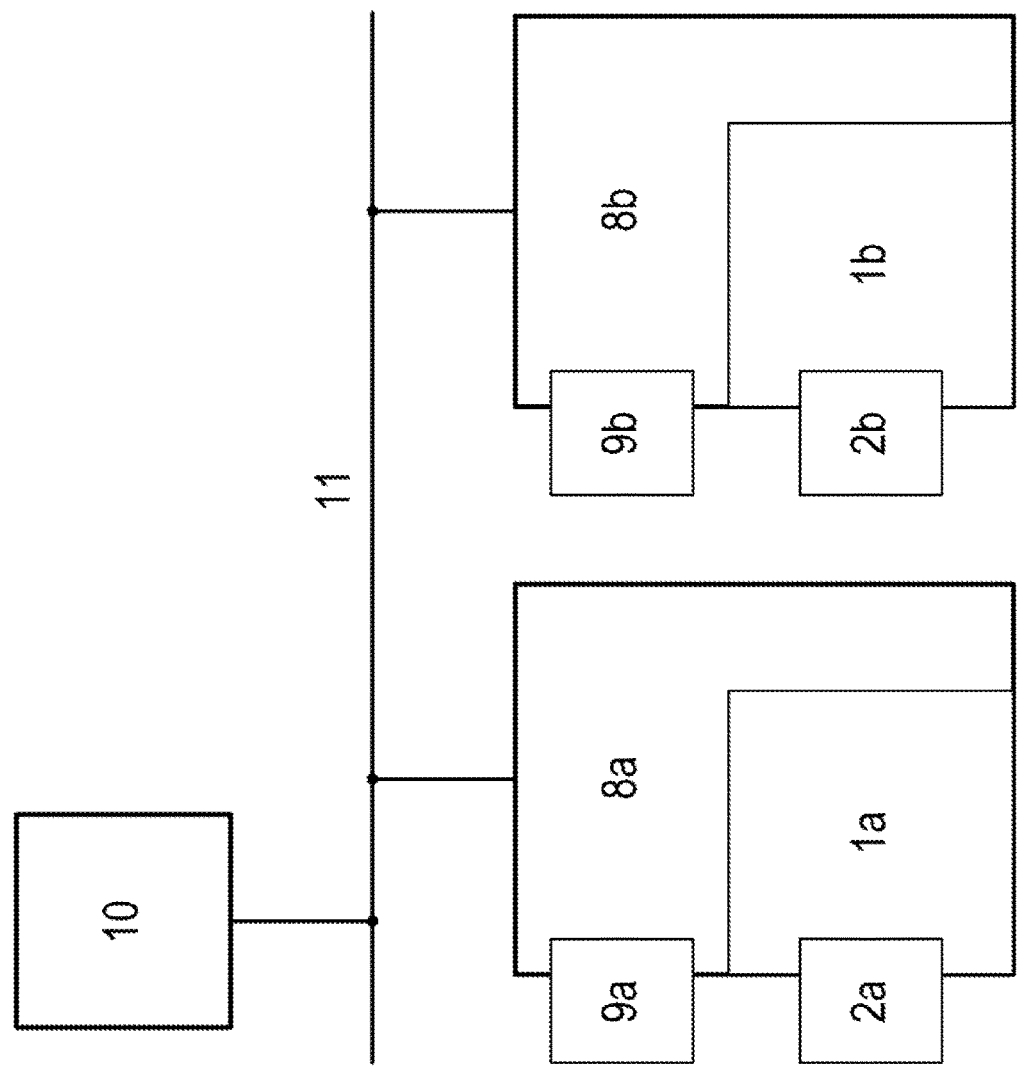
FIG. 2 schematically illustrates security devices in a system of automation components.
Figure 3:
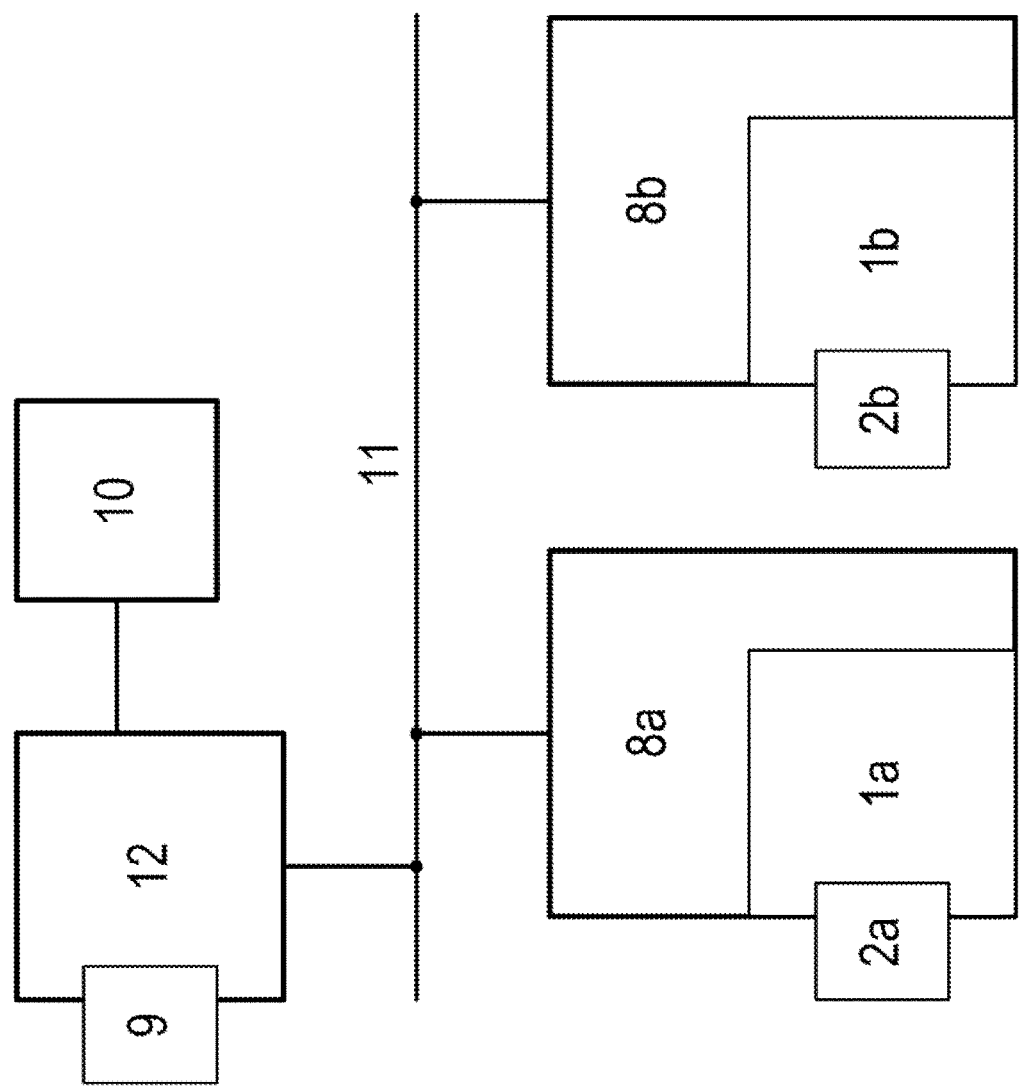
FIG. 3 schematically illustrates security devices in a system of automation components.
Figure 4:
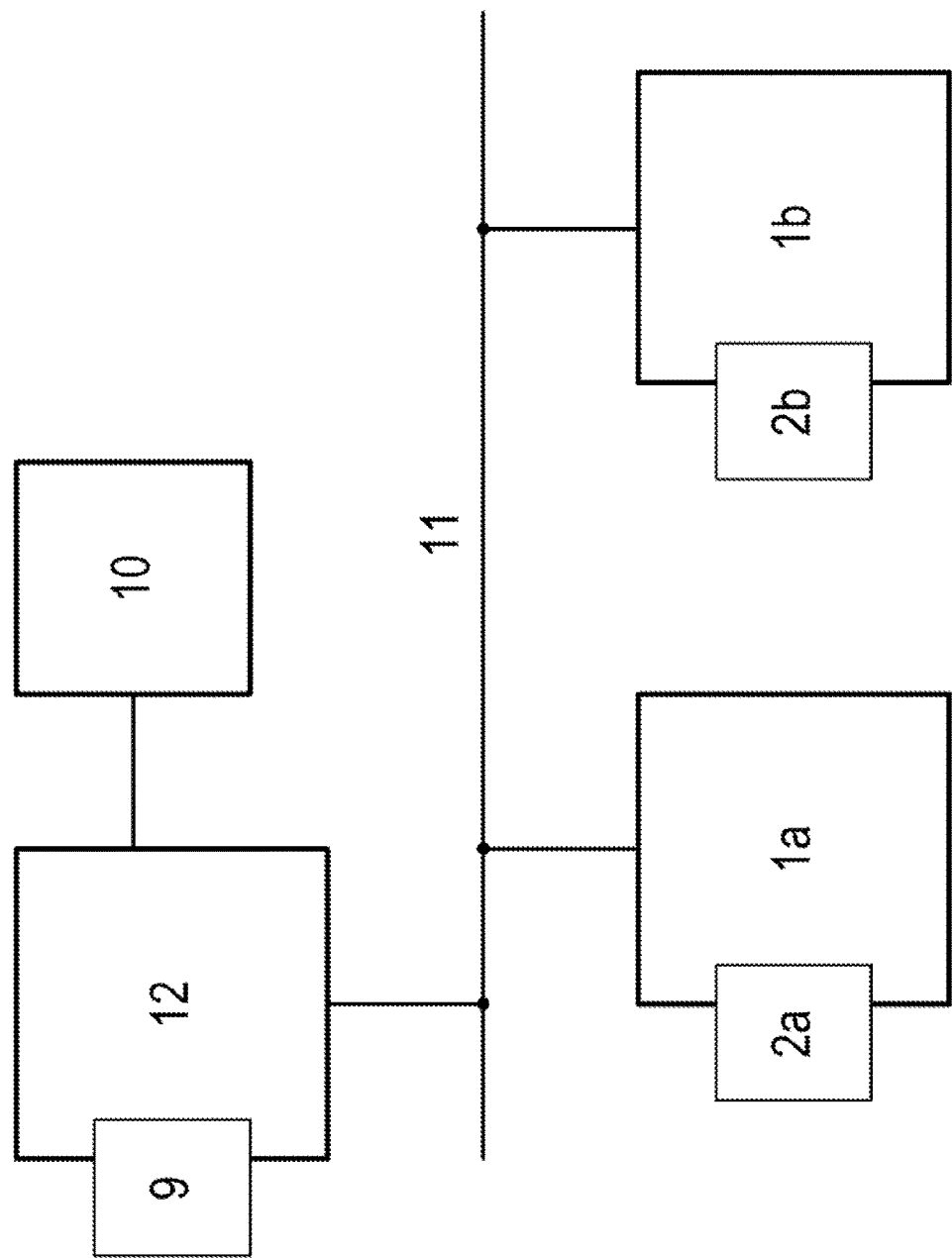
FIG. 4 schematically illustrates security devices in a system of automation components.

Moreover, security devices in a system of automation components according to example embodiments of the present invention are schematically illustrated in FIGS. 2 through 4, a first security device (1a) being electrically connected to a first key memory (2a), especially using plugs, and a further security device (1b) being electrically connected to a further key memory (2b), especially with the aid of plugs.

In FIGS. 2 and 3, security devices (1a, 1b) are electrically connected to a field-bus system (11) via a converter (8a, 8b) in each case, especially using plugs.

In FIG. 4, the security devices (1a, 1b) are directly electrically connected to a field-bus system (11), especially by plugs.

In FIG. 2, a separate memory module (9a, 9b) is electrically directly connected to the converters (8a, 8b), especially by plugs, and a parameterization device (10) is directly electrically connected to a field-bus system (11), especially using plugs.

In FIGS. 3 and 4, a memory module (9) is directly electrically connected to a higher-level control (12), especially using plugs, the higher-level control (12) being directly electrically connected to a field-bus system (11), especially with the aid of plugs. In addition, a parameterization device (10) is electrically directly connected to the higher-level control (12), especially using plugs.

LIST OF REFERENCE CHARACTERS (1, 1a, 1b) security device
(2, 2a, 2b) key memory, able to be plugged in and location-bound
(3) memory element for parameter data record
(4) check-sum information of the parameter data record
(5) comparator unit
(6) memory element for check-sum information of the key memory
(7) enabling information of the comparator unit
(8, 8a, 8b) converter
(9, 9a, 9b) memory unit, able to be plugged in or integrated
(10) parameterization device
(11) field-bus system, in particular PROFINET, PROFIBUS, EtherNet/IP or a comparable communications protocol
(12) higher-level control, in particular a memory-programmable control (SPS; Programmable Logic Controller, PLC)
(13) calculation unit for check-sum information

The invention claimed is:

1. A security device adapted for use in security-directed applications, comprising:
at least one first non-volatile memory including a parameter data record for operation of the security device;
a key memory having at least one second non-volatile memory including at least one data field, the data field including check-sum information, the key memory being location-bound and/or spatially permanently allocatable to a specific point;
a physical interface adapted to exchange data with the key memory and being spatially restricted;
at least one calculation unit adapted to dynamically ascertain check-sum information from the parameter data record; and
at least one comparator unit adapted to compare check-sum information included in the key memory to the dynamically ascertained check-sum information and to supply a result of the comparison to the security device as enabling information, an operating state of the security device depending on the enabling information of the comparator unit;
wherein enabling information that signals an equality of the check-sum information enabling the security device to switch from a secure operating state to a normal operating state and/or to a state featuring an electric motor under torque;
wherein enabling information that signals an inequality of the check-sum information enabling the security device to switch to a secure operating state and/or to a state featuring a torque-free electric motor;
wherein the key memory is connectable to the security device using plugs, via a device adapted to accommodate the key memory through a housing of the security device;
wherein the security device is adapted to read out the key memory via an electrically conductive connection that includes only two lines or a one-wire bus; and
wherein the system is included in an electronic power-drive system having adjustable rotational speed.

2. The device according to claim 1, wherein the security device is directly connectable to a converter and/or connectable to the converter using plugs, a memory module being directly connected to and/or integrated into the converter.

3. The device according to claim 2, wherein a parameterization device is adapted to connect to the converter.

4. The device according to claim 2, wherein a parameterization device is adapted to directly connect to the converter.

5. The device according to claim 1, wherein the security device is directly connectable to a converter and/or connectable to the converter using plugs, the converter being connected via a field-bus system to a higher-level control and/or to a memory-programmable control, the higher-level control having a memory module.

6. The device according to claim 5, wherein a parameterization device is directly connectable to the higher-level control and/or to the memory-programmable control.

7. The device according to claim 1, wherein the security device is adapted to connect via a field-bus system to a higher-level control and/or to a memory-programmable control, the higher-level control having a memory module.

8. The device according to claim 1, wherein a parameterization device is adapted to modify the parameter data record.

9. The device according to claim 1, wherein the key memory is adapted to store the ascertained check-sum information.

10. The device according to claim 1, wherein:
   a memory, arranged outside of the security device, is adapted to store a shadow copy of the parameter data record via a parameterization device.

11. The device according to claim 1, wherein via a connection chain, the key memory is permanently connectable to a location in which the security device is installed.

12. The device according to claim 1, further comprising a device adapted to permanently connect the key memory to the security device and/or a device having a mechanism adapted to secure and release a plug-in connection.

13. The device according to claim 1, wherein the range of the physical interface is spatially restricted to an immediate vicinity around the security device.

\* \* \* \* \*